(12) United States Patent
Rooney et al.

(10) Patent No.: US 7,596,642 B2
(45) Date of Patent: *Sep. 29, 2009

(54) SYSTEM AND PROGRAM FOR DETERMINING THE AVAILABILITY OF PATHS TO A DEVICE

(75) Inventors: William J. Rooney, Hopewell Junction, NY (US); Harry Morris Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/167,936

(22) Filed: Jul. 3, 2008

(65) Prior Publication Data
US 2008/0270644 A1    Oct. 30, 2008

Related U.S. Application Data

(63) Continuation of application No. 11/005,967, filed on Dec. 6, 2004, now Pat. No. 7,451,252, and a continuation of application No. 09/670,736, filed on Sep. 27, 2000, now Pat. No. 6,850,997.

(51) Int. Cl.
*G06F 3/00* (2006.01)
(52) U.S. Cl. .................. 710/38; 710/36; 340/825; 370/216; 370/217; 370/220
(58) Field of Classification Search .............. None
See application file for complete search history.

(56) References Cited

U.S. PATENT DOCUMENTS

| 6,542,469 | B1* | 4/2003 | Kelley et al. | 370/238 |
| 6,978,309 | B1* | 12/2005 | Dorbolo | 709/231 |
| 2003/0016624 | A1* | 1/2003 | Bare | 370/217 |

* cited by examiner

*Primary Examiner*—Eron J Sorrell
(74) *Attorney, Agent, or Firm*—Rabindranath Dutta; Konrad Raynes & Victor LLP (57) ABSTRACT

Disclosed is a system and program for selecting one of multiple proposed paths to a device. For each proposed path, a determination is made of a number of components the proposed path shares with existing paths to the device. The components comprise points of failure such that if one component fails then the path including the component fails. The determined number of shared components for each proposed path is used to select one proposed path.

20 Claims, 8 Drawing Sheets

Compare Channel Components Command

FIG. 5

Response Block

| Manufacturer | Device Type | Model No. | Cluster Mask | I/O Bay Mask | Interface Mask |
|---|---|---|---|---|---|
| IBM | 3990 | 006 | 00F0 | 00FC | 0000 |
| IBM | 3990 | G03 | 00F0 | 00FC | 0000 |
| IBM | 3990 |  | 00F0 | 00FC | 0000 |
| IBM | 2105 |  | 0080 | 00E0 | 00FC |
| IBM |  |  | 0080 | 00E0 | 00FC |
| ABC | 3990 | 03 | 00F0 | 00FC | 0000 |
|  |  |  | 00F0 | 00FC | 0000 |

SYSTEM AND PROGRAM FOR DETERMINING THE AVAILABILITY OF PATHS TO A DEVICE

CROSS-REFERENCE TO RELATED APPLICATIONS

This application is a continuation of application Ser. No. 11/005,967 filed on Dec. 6, 2004, which is incorporated herein by reference in its entirety.

Application Ser. No. 11/005,967 is a continuation of application Ser. No. 09/670,736 filed on Sep. 27, 2000, which is incorporated herein by reference in its entirety.

This patent application is also related to the commonly assigned patents filed on the same date as application Ser. No. 09/670,736 and which patents are incorporated herein by reference in their entirety:

"System, Method, and Program for Determining the Availability of Interfaces to a Control Unit", to Brent C. Beardsley, William J. Rooney, and Harry M. Yudenfriend, having U.S. Pat. No. 6,748,557; and "System, Method, And Program For Determining The Availability of Interfaces to a Device from Information Provided by the Device", to Brent C. Beardsley, William J. Rooney, and M. Yudenfriend, having U.S. Pat. No. 6,745,347.

BACKGROUND OF THE INVENTION/ON

1. Field of the Invention

The present invention relates to a system, method, and program for analyzing and selecting channel paths to a device.

2. Description of the Related Art

Host computer systems may perform input/output (I/O) operations against a storage unit, such as a Direct Access Storage Device (DASD), which is comprised of numerous interconnected hard disk drives (HDDs) that form a single mass storage space. In such systems, a storage controller, also referred to as a control unit, manages input/output (I/O) operations between the host systems and the DASD. Examples of control units include the International Business Machines ("IBM") Enterprise Storage Server, described in the publication "IBM Enterprise Storage Server: Introduction and Planning Guide", IBM document no. GC26-7294-02 (IBM Copyright, November 1999) and the IBM 3990 Storage Controller, described in IBM publication, "IBM 3990 Storage Control Reference (Models 1, 2, and 3), IBM document no. GA32-0099-06 (Copyright IBM Corp. 1988, 1994), which publications are incorporated herein by reference in its entirety.

The hosts include a channel subsystem that directs the flow of data between the host main storage and the storage controllers. In current implementations, each host may have up to 256 channels. Each channel is identified by a channel path identifier (CHPID). A channel comprises a host adaptor into which a cable is connected that leads directly to an interface port on the storage controller or a port in a switch that links to the storage controller. A channel path comprises the physical connection from a host adaptor to a port on a switch, such as an ESCON director, and the connection from another port on the same switch to an interface port in the control unit. In current implementations, a channel path in the host may be dynamically assigned to one physical path comprising the connection links from the host adaptor to the switch port, and then from another port on the same switch to the interface port in the control unit. The commonly assigned and co-pending U.S. patent application Ser. No. 09/407,544, entitled "Method, System, and Program Products for Managing I/O Configurations of a Computing Environment" filed on Sep. 28, 1999 by P. B. Yocom, H. M. Yudenfriend, W. J. Rooney, Richard Cwiakala, which patent is incorporated herein by reference in its entirety, describes an architecture for allowing the dynamic assignment of channel paths in the host to different physical paths from the host to the control unit.

The above patent mentions that one goal of dynamically assigning host channel paths to a physical path is to find the path assignment for a channel path that provides the best availability, i.e., avoids any single point of failures. For this reason, there is a need in the art to determine the path that optimizes the overall availability of all the paths to the storage controller.

SUMMARY OF THE PREFERRED EMBODIMENTS

To determine the availability of storage controller resources, preferred embodiments disclose a system, method, and program for selecting one of multiple proposed paths to a device. For each proposed path, a determination is made of a number of components the proposed path shares with existing paths to the device. The components comprise points of failure such that if one component fails then the path including the component fails. The determined number of shared components for each proposed path is used to select one proposed path.

In further embodiments, using the determined number of shared components to select one proposed path comprises selecting the proposed path having a least number of shared components with existing paths. In such case, the selected proposed path is selected to provide an additional path to the device. Alternatively, using the determined number of shared components to select one proposed path comprises selecting the proposed path having a greatest number of shared components with existing paths. In such case, each proposed path comprises one existing path to the device and the selected proposed path is selected to be removed as one of the paths to the device.

In still further embodiments, each path may include a host adaptor in a computer and an interface port in the device. Determining the number of components the proposed path has in common with existing paths further comprises determining a number of points of failure the host adaptor in the proposed path shares with the host adaptors of existing paths to the device and determining a number of points of failure the interface card in the proposed path shares with the interface cards of existing paths to the device.

Yet further, each path may further include a source port and destination port on a switch. In such case, the host adaptor for a path connects to the source port of the switch and wherein the interface port for the path connects to the destination port of the switch. Determining the number of components the proposed path has in common with existing paths further comprises determining components on the switch the proposed path has in common with existing paths.

Preferred embodiments provide a technique for determining the relative availability of proposed paths to a device. In preferred embodiments the relative availability of one proposed path to a device versus another is determined by examining the number single points of failure the proposed paths share with the existing paths to the device. The proposed path that has the least number of single points of failure shared with the existing paths would be selected to provide a new channel path to the device. Likewise, the proposed path having the greatest number of shared single points of failure with the existing paths would be selected to be removed from the paths leading to the device. In this way, preferred embodiments optimize overall system availability by selecting a path to add or remove based on the relative availability of the path.

BRIEF DESCRIPTION/ON OF THE DRAWINGS

Referring now to the drawings in which like reference numbers represent corresponding parts throughout.

DETAILED DESCRIPTION/ON OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
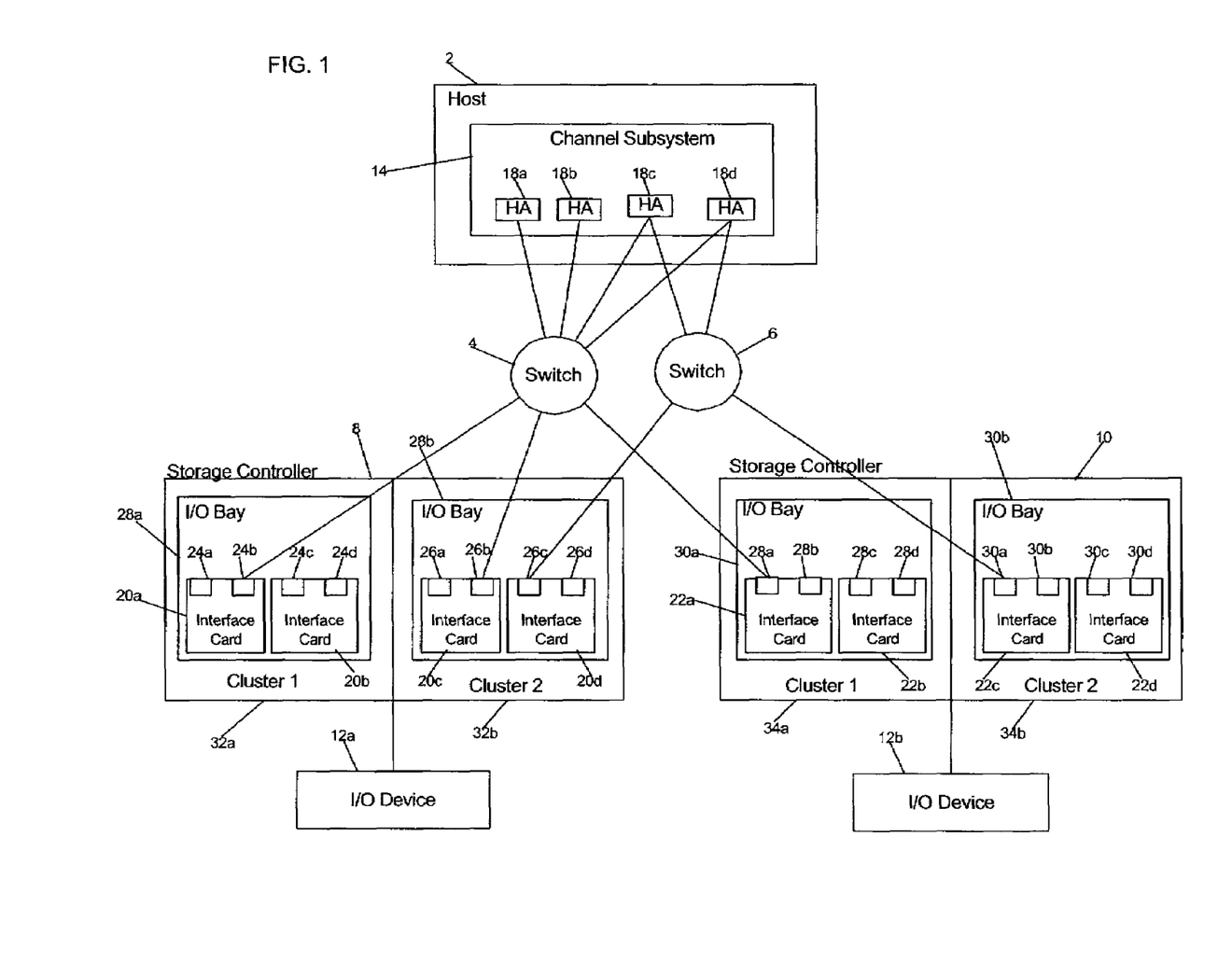
FIG. 1 is a block diagram illustrating a computing environment in which preferred embodiments are implemented.

FIG. 1 illustrates an arrangement of a host 2, switches 4 and 6, and storage controllers 8 and 10. The storage controllers 8 and 10 provide access to I/O devices 12a, b, which may comprise any storage device known in the art, such as interlinked hard disk drives, tape storage, etc. In preferred embodiments, the host 2 includes a channel subsystem 14 which manages I/O operations for the host. The channel subsystem 14 provides channels 18a, b, c, d along which a host I/O is communicated and managed to the I/O devices 12a or b. A channel 18a, b, c, d is comprised of a host adaptor (HA) that provides a physical connection from the host 2 to the switches 4, 6. The channel subsystem 14 may use dynamic channel path management, such as the dynamic channel path management technique described in the co-pending patent application entitled "Method, System, and Program Products for Managing I/O Configurations of a Computing Environment", having U.S. patent application Ser. No. 09/407,544, incorporated by reference above, to assign channels 18a, b, c, d to a physical connection to one of the storage controllers 8 or 10.

A physical connection is defined as the physical connection from a channel 18a, b, c, d to a port on one switch 4 and 6, and from another port on the same switch 4 or 6 to a port on one interface card in the storage controllers. The switches 4 and 6 may comprise ESCON directors having numerous ports, or any other type of switching device known in the art.

The storage controllers 8 and 10 also include Input/Output bays 29a, b and 31a, b, respectively, into which the interface cards 20a-d and 22a-d, respectively, are attached. The interface cards 20a, b, c, d and 22a, b, c, d include ports 24a, b, c, d, 26a, b, c, d, 28a, b, c, d, and 30a, b, c, d into which the cable from the switch 4, 6 port connects. The I/O bays 29a, b and 31a, b, comprise cages that plug into the clusters 32a, b or 34a, b, and provide the interface electronics for the interface cards 20a-d and 22a-d. Each I/O bay 29a, b and 31a, b, may be serviced separately, such that one I/O bay can be taken off-line and serviced without affecting the operations of the interface cards in another I/O bay.

Each storage controller 8 or 10 includes clusters 32a, b and 34a, b, respectively, which comprise a separate power boundary such that a power failure on one cluster will not affect the components of the other cluster which can remain active and on-line.

Figure 2:
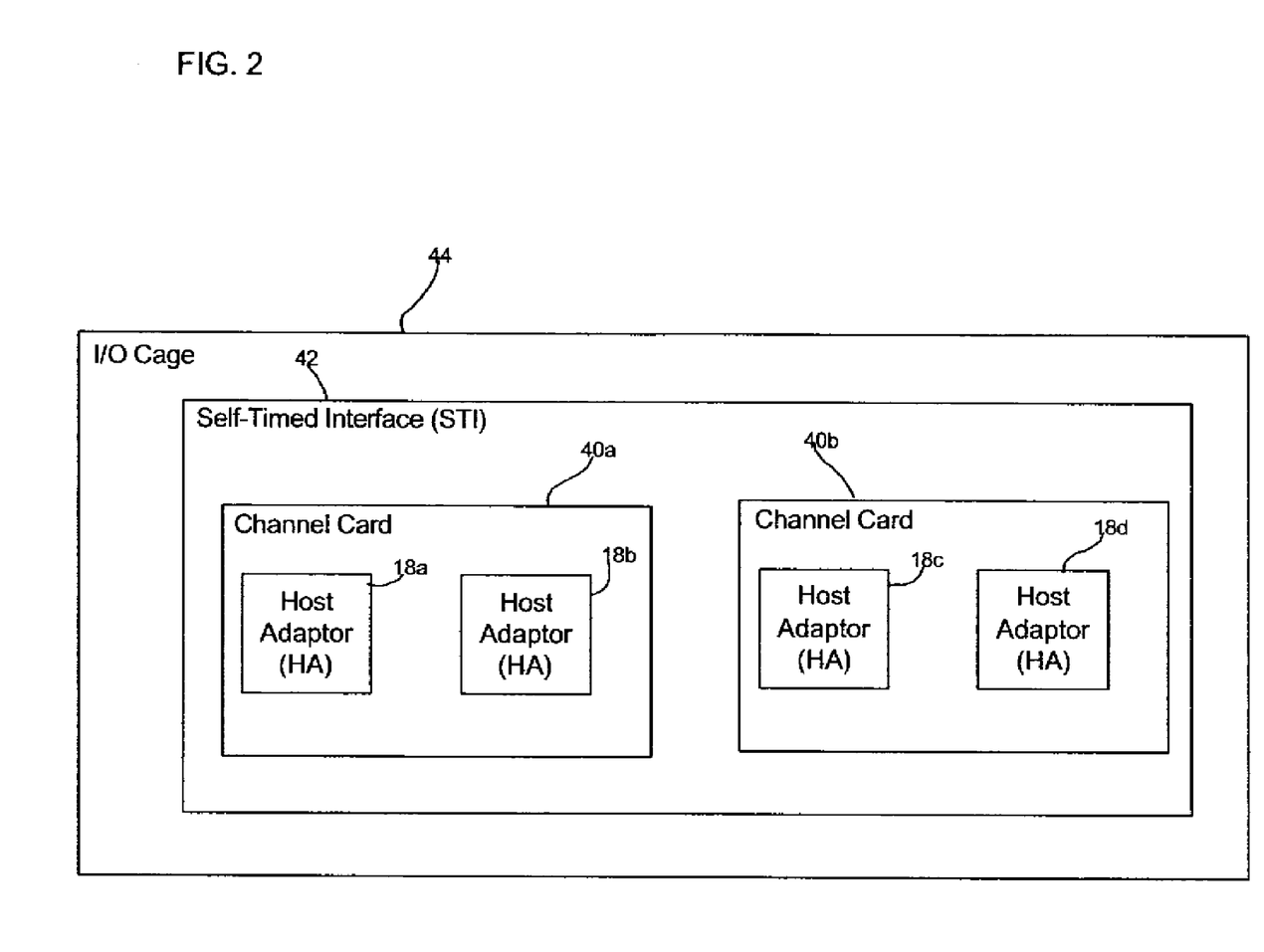
FIG. 2 is a block diagram illustrating further details of the computing environment in which preferred embodiments are implemented.

FIG. 2 illustrates the hardware in the host 2 including the host adaptors (HA) 18a, b, c, d. Channel cards 40a, b, respectively, include one or more host adaptors 18a, b and 18c, d. Each channel card 40a, b is plugged into one self-timed interface (STI) card 42, and each self-timed interface (STI) card 42 is included in an I/O cage 44. In this way, one channel card can include multiple host adaptors, one self-timed interface (STI) card can include multiple channel cards, and one I/O cage can include multiple self-timed interface (STI) cards.

The arrangements of FIGS. 1 and 2 are a preferred topology and are not intended to limit the invention. In alternative embodiments, there may be multiple hosts, a particular host may include more host adaptors (HA) than shown; a switch may have multiple ports for connecting with the hosts and control units; each storage controller 8 and 10 may include more than two clusters; each cluster may include more than two I/O bays; each I/O bay may include more than two interface cards; and each interface card may have one or more ports to connect to switches 4, 6 ports; each channel card 40a, b may include more than two host adaptors (HAs); each self-timed interface may include more than two channel cards 40a, b; each I/O cage may include more than one self-timed interface (STI) card. Further there may be multiple I/O cages within the host. Still further, there may be no switches, thereby providing a direct connection from a host adaptor to an interface port.

When defining a channel 18a, b, c, d from the host 2 to a switch 4, 6, it is desirable to select a channel path that improves the availability of the overall system by avoiding a single point of failure with current existing channel paths to the storage controller 8, 10. Preferably, the host 2 would want to provide at least two channel paths with no common single points of failure to each storage controller 8 and 10 to avoid a single point of failure to the storage controller. To accomplish this goal, the host 2 would want to analyze each point in the connections from the host adaptor 18a, b, c, d, to the ports in the switches 4 and 6 to interface ports 24a, b, c, d; 26a, b, c, d; 28a, b, c, d; 30a, b, c, d to select a path through such components that avoids a single point of failure with paths currently used, such that if any point in the current physical paths assigned to channels failed, such failure would not affect the alternative redundant physical path to which the new channel path will be assigned. Preferred embodiments are concerned with determining the availability index of selecting an interface port at the control unit. This availability index of a proposed interface to the control unit may then be considered with availability index at different levels, such as the switch level and host adaptor level using different availability calculation techniques.

The single points of failure in the overall system comprise those components whose failure would lead to a failure of the channel path that includes such components. For instance, in the storage controllers 8, 10, the interface cards 20*a, b, c, d* and 22*a, b, c, d*; the I/O bays 29*a, b* and 31*a, b*; and the clusters 32*a, b* and 34*a, b* comprise single points of failure in that if any of these components fail, the channel path to the storage controller 8, 10 using these components also fails. The single points of failure in the switches 4, 6 comprise the entire switch as well as port cards in the switches that contain the ports to connect to the host adaptors 18*a, b, c, d* and the interface cards. The single points of failure in the host 2 comprise the channel cards 40*a, b*, the self-timed interface (STI) 42, and the I/O cage 44. In further embodiments, there may be additional components in the host 2 that function as single points of failure. For instance, there may be a memory bus adaptor between the self-timed interface (STI) and I/O cage or channel driver card between the channel card and the STI that comprises an additional single point of failure in the host or multiple power boundaries in the switch which provide further single points of failure.

For instance, if the host 2 already had a connection to switch 4, but not switch 6, then the host would want to add a channel path that includes switch 6 to avoid the current single point of failure at switch 4. Still further, if the host 2 already had a channel path using one cluster 32*a* on storage controller 8, then the host would want a new channel 18*a, b, c, d* to use the other cluster 32*b*, thereby allowing the connection to survive the failure of one cluster power boundary. Still further, if the host 2 had channel paths to both clusters 32*a* and 32*b* of the storage controller 8, then to improve availability, the host 2 would want add a channel path including an I/O bay in one cluster that is not used by a host 2 channel. Using this general approach, the host 2 can determine the interface card 20*a, b, c, d* and 22*a, b, c, d* and port thereon to use to connect to the storage controllers 8 and 10 to select an I/O bay and cluster that avoids a single point of failure. Similarly, if the host 2 already had a channel path using one channel card to the storage controller 8, then the host would want to select a channel path using a channel card that is not already used to connect with the storage controller 8. The same is the case with the self-timed interface and I/O cage for the processor.

Preferred embodiments provide a methodology for determining the availability rating of each channel path to the storage controller 8 or 10 to select a channel path comprising a host adaptor that connects to a switch and then to an interface port in the storage controller that will increase the overall availability to the selected storage controller 8 or 10. In this way, a physical path is preferably selected such that a failure in the currently used I/O cages, self-timed interfaces (STI), and channel cards at the host level, or the switch or interface ports on the switch, or the currently used cluster, I/O bay, and interface card in the storage controller will not cause a failure in the selected channel path.

Figure 3:
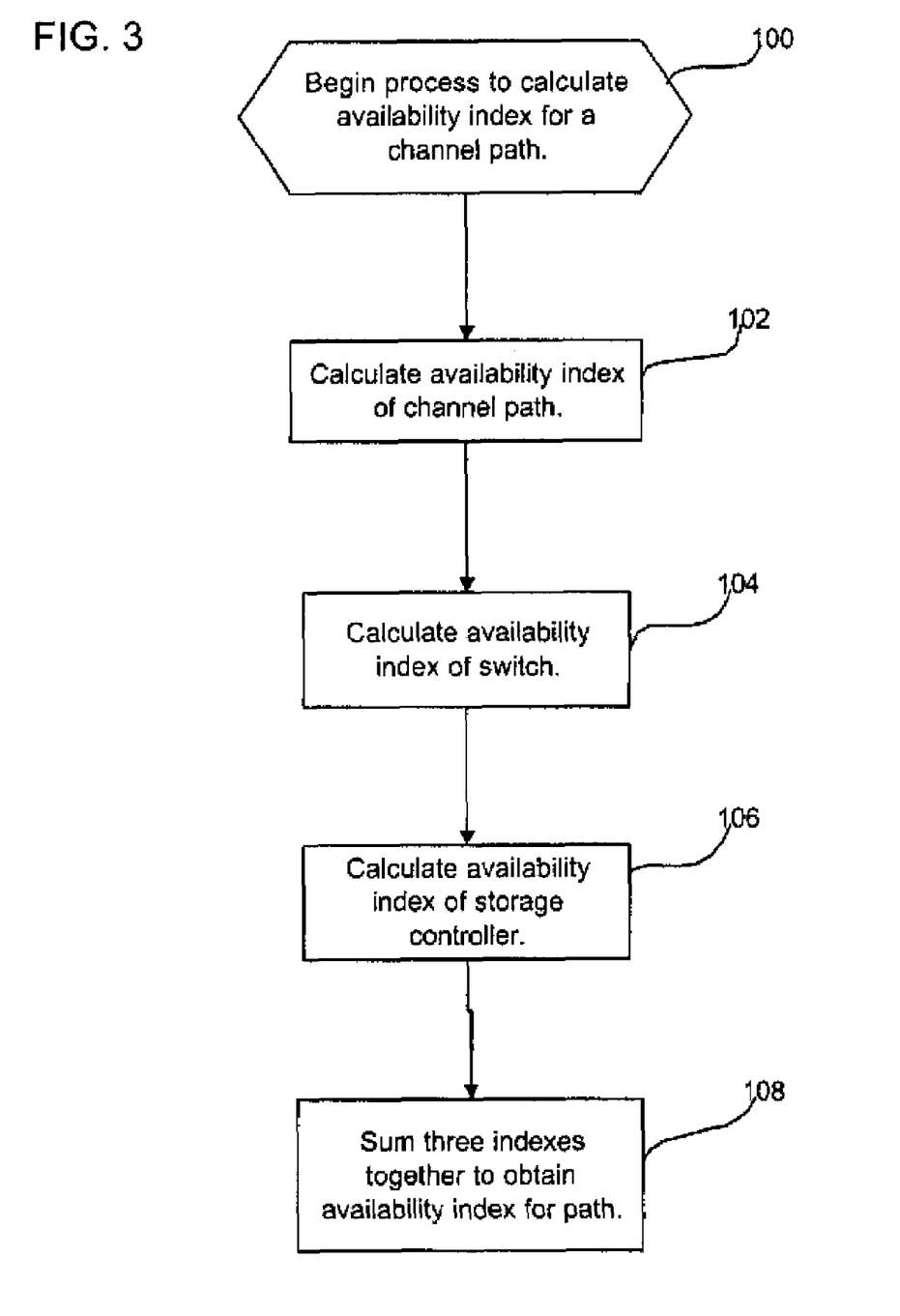
FIG. 3 illustrates logic to determine an availability index for a channel path in accordance with preferred embodiments of the present invention.

FIG. 3 illustrates the overall flow implemented in the host 2 for calculating the availability index for a channel path. The host 2 would check the availability index for all possible channel paths providing a connection to the desired storage controller 8, 10. To determine the overall availability for one proposed channel path, control begins at block 100. At block 102, the host 2 determines the availability index for the channel path within the host. A particular channel path has a higher availability and fewer single points of failure to the extent it does not share a channel card 40*a, b*, a self timed interface 42 and/or an I/O cage 44 with another channel path, i.e., host adaptor 18*a, b, c, d*, that provides an existing path to the target storage controller 8, 10. Next, the host 2 determines (at block 104) the availability index for the switch 4, 6 the proposed channel path uses to connect to the target storage controller 8, 10. The channel path being considered includes a cable connecting the host adaptors to a source port in one switch 4, 6 and would already have a dedicated destination port that channel path uses from the switch 4, 6 to the target storage controller 8, 10. The availability index and single points of failure for the switch of the proposed channel path is higher to the extent the source and destination ports of the proposed channel path shares a port card with another existing channel path connected to the target storage controller 8, 10.

The host 2 further calculates the availability index for a particular interface card 20*a, b, c, d*, or 22*a, b, c, d* to the target storage controller 8, 10. As discussed, the proposed channel path uses the switch to connect to one port 24*a, b, c, d*; 26*a, b, c, d*; 28*a, b, c, d*; or 30*a, b, c, d* of the target storage controller 8, 10. The host 2 would thus have to determine the components (e.g., the interface card, I/O bay, cluster) in the storage controller 8, 10 the proposed channel path shares with existing channel paths to the target storage controller. The proposed channel path has a higher availability index to the extent it shares an interface card 20*a, b, c, d* or 22*a, b, c, d*; I/O bay 29*a, b* or 31*a, b*; and cluster 32*a, b* or 34*a, b* with the existing channel paths that already connect to the target storage controller 8, 10.

In preferred embodiments, all the components in the host 2 (e.g., channel card, self-timed interface, I/O cage), switch 4, 6 (e.g., switch, port cards), and storage controllers 8, 10 (e.g., interface cards, I/O bay, cluster) comprise single points of failure in that if one of these components fails all the channel paths including such failed components would fail.

In preferred embodiments, the higher the value of the availability index, the less available the path, i.e., the less likely the path will maintain availability in the event of the failure of one of the components. By examining the availability index of each possible channel path to a device, the host 2 may select a channel path to add that will improve the overall availability of the system by considering the availability within the host, at the switch, and within the storage control. Thus, the preferred embodiments consider the availability at all levels of the system, and improves availability in the event of a failure at the host, switch, and/or storage controller.

Moreover, when removing a channel path to a storage controller, the host 2 would want to determine the availability of each proposed channel path to remove the channel path having the lowest availability, i.e., the highest availability index value.

Determining the Availability of a Channel Path

Figure 4:
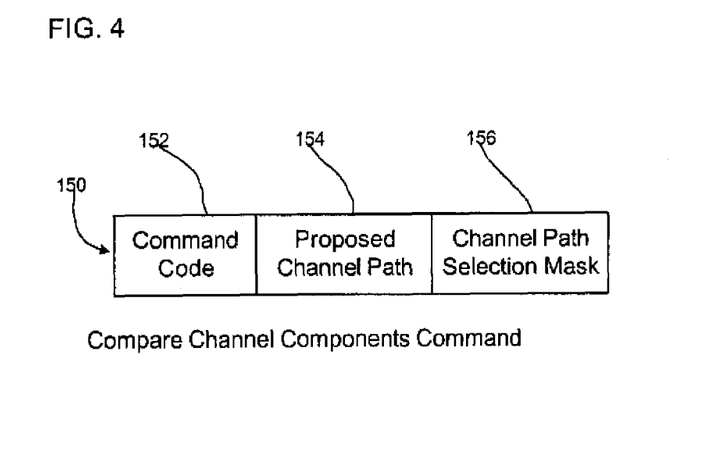
FIG. 4 illustrates a format of a command used to obtain information on shared components for use in determining the availability index in accordance with preferred embodiments of the present invention.

In preferred embodiments, the host 2 submits a command to determine the availability index for a proposed channel path at the host level. FIG. 4 illustrates the fields in a compare channel components command 150 the host 2 issues to obtain information as to whether the proposed channel path shares a channel card 40*a*, self-timed interface 42 and/or an I/O cage 44 with each channel path already connected to the storage controller 8, 10. A command code field 152 specifies the compare channel components command. A proposed channel path field 154 indicates the proposed channel path being considered to use to connect to the target storage controller 8, 10. The channel path selection mask 156 comprises a 256 bit array, where each bit corresponds to one channel path. An "on" bit value indicates that the channel path corresponding to the bit value already connects to the target storage controller 8, 10, whereas an "off" value indicates that the corresponding channel path does not connect to the target storage controller 8, 10.

In preferred embodiments, the host 2 can construct the channel path selection mask 156 from a subsystem control block (SSCB), which has information on all the channel paths (CHPIDs) to a storage controller. The SSCB represents the storage controller in the host 2, and has an eight array of up to eight channels currently connected to the storage controller. Each byte of the SSCB array is capable of indicating the CHPID number for the channel path that provides a connection to the storage controller. Thus, the channel path selection mask 156 would have the bit value "on" for those bits corresponding to the channel paths (CHPIDs) identified in the SSCB array.

Figure 5:
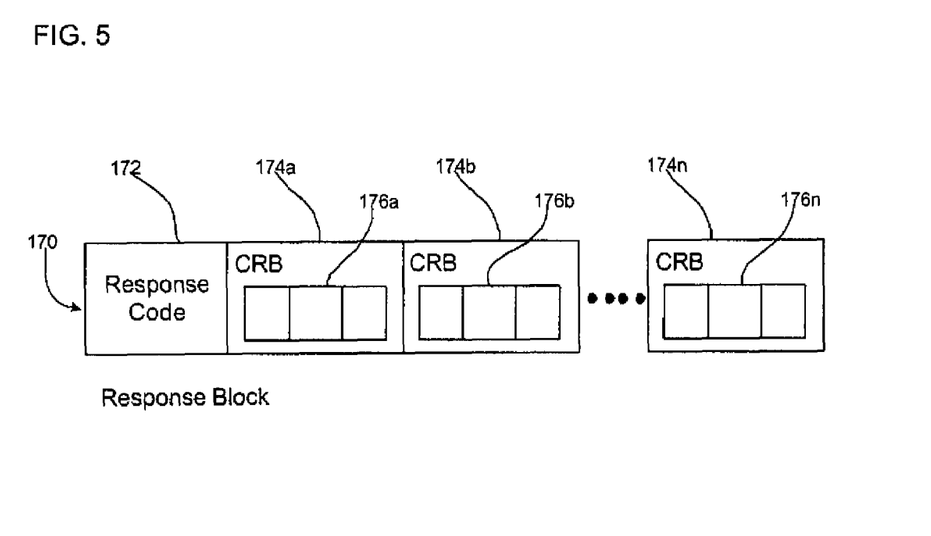
FIG. 5 illustrates a format of a response to the command illustrated in FIG. 4 in accordance with preferred embodiments of the present invention.

FIG. 5 illustrates a response block 170 that the host 2 returns in response to the compare channel components 150 command. The response block 170 includes a response code field 172 identifying the data structure as a response to a compare channel components command and one comparison result block 174a, b, . . . n (CRB) for each channel path identified in the channel path selection mask 156 that provides a connection to the target storage controller 8, 10. Each comparison result block 174a, b, . . . n (CRB) includes a common components bit array 176a, b, . . . n that includes a bit for each component the proposed channel path and existing channel paths to the target storage controller could possibly have in common. With respect to FIG. 2, the possible shared components for the host adaptors 18a, b, c, d in the channel paths include the channel card 40a, b, the self-timed interface (STI) 42 and the I/O cage 44. Thus, if the proposed channel path and one of the existing channel paths were plugged into the same channel card 40a, b, then the channel card bit in the array 176a, b, . . . n would have an "on" value, otherwise the bit would have an "off" value. If the proposed channel path and the existing channel path were plugged into channel cards 40a, b that are on the same self-timed interface (STI) card 42, then the STI bit in the array 176a, b, . . . n for the existing channel path would have an "on" value. Similarly, if the proposed channel path and existing paths are located in the same I/O cage 44, then the I/O cage bit in the array 176a, b, . . . n for the existing channel path would have an "on" value.

In preferred embodiments, when constructing the comparison result blocks (CRB) for each existing channel path to the target storage controller 8, 10, the host 2 would determine the configuration and components for the channel paths from I/O configuration information maintained in the channel subsystem 14. Such I/O configuration information would indicate the host adaptor 18a, b, c, d, channel card 40a, b, self-timed interface (STI) 42, and IPO cage 44 for each channel path.

The channel path availability index is calculated (at block 102 in FIG. 3) by adding together all the "on" bits, which have a value of "1", in the common components array 176a, b, . . . n in each existing channel path having a comparison result block 174a, b, . . . n (CRB) in the response block 170. Thus, the higher the availability index, the more components (i.e., single points of failure) the proposed channel path has in common with existing channel paths already connected to the target storage controller, and the less availability the proposed channel path would provide if used as the additional path to the storage controller.

Determining the Availability of a Switch Used by the Channel Paths

Figure 6:
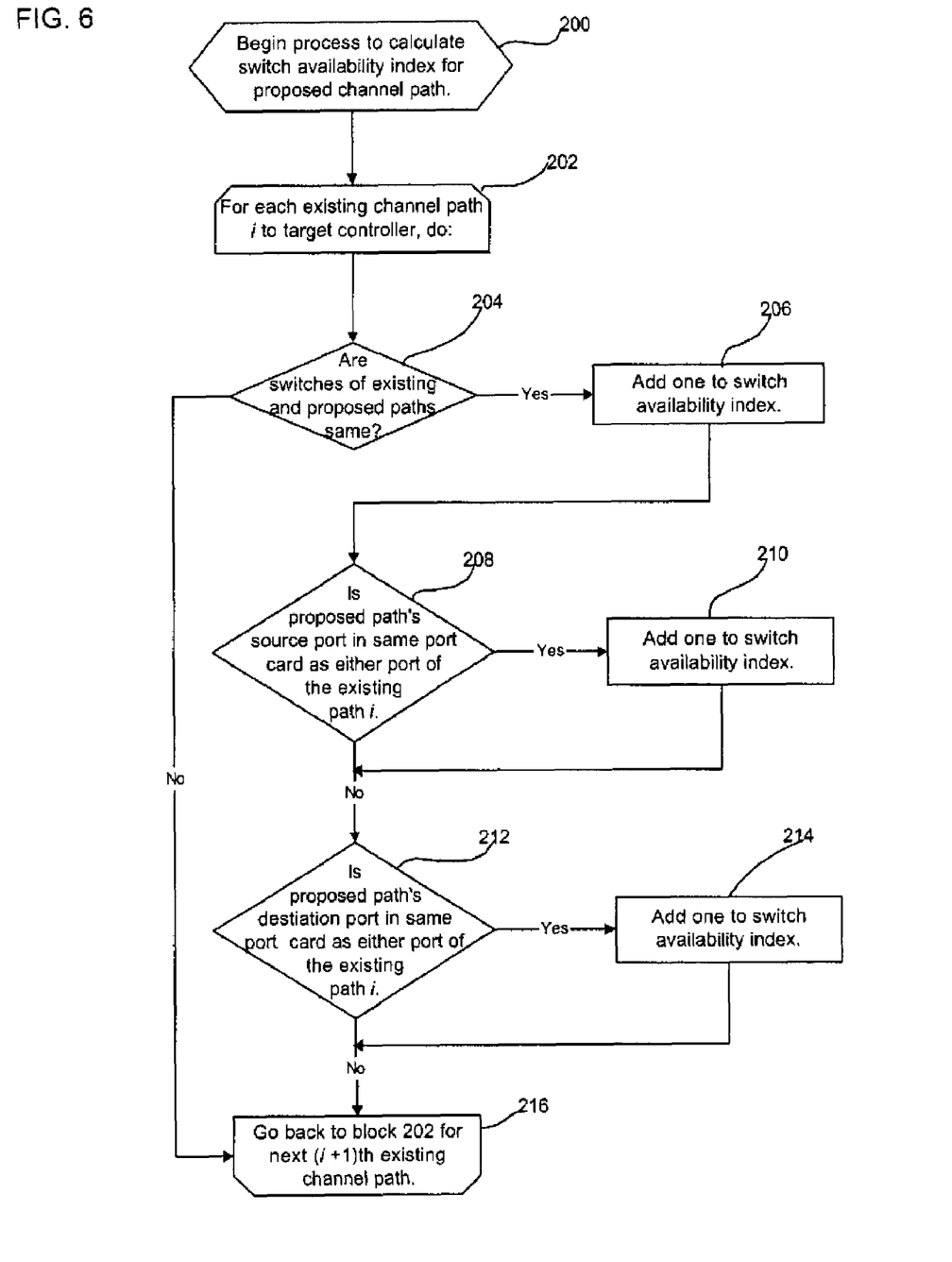
FIG. 6 illustrates logic to determine an availability index for a switch used by the channel path and any existing paths in accordance with preferred embodiments of the present invention.

As discussed, a channel path includes a host adaptor 18a, b, c, d (FIG. 1) that connects via a cable to a source port on a port card in one switch 4, 6. A cable extends from a destination port on a port card in the switch 4, 6 to the target storage controller 8, 10. Thus, the channel path to the storage controller includes source and destination ports on the port cards of a switch. FIG. 6 illustrates logic implemented in the host 2, beginning at block 200, to determine the availability index for the switch for one proposed channel path. From blocks 202 to 216, the host 2 performs a loop for each existing path i to the target storage controller 8, 10 to determine whether the proposed channel path uses any of the same switch components as existing path i, thereby indicating a lower availability.

If (at block 204) the switches of the existing path i and proposed path are the same, then the host 2 adds (at block 206) a value of one to the switch availability index. Otherwise, if the switches are not the same, then the host 2 considers (at block 216) the next (i+1)th existing channel path to the target storage controller 8, 10. After adding one to the switch availability index (at block 206), the host 2 then determines (at block 208) whether the proposed path's source port on the switch uses the same switch port card as either the source or destination port of the existing channel path i. If so, then one is added (at block 210) to the switch availability index. From the no branch of block 208 or block 210, the host 2 determines (at block 212) whether the proposed path's destination port on the switch uses the same switch port card as either the source or destination port of the existing channel path i. If so, then one is added (at block 214) to the switch availability index. From the no branch of block 212 or block 214, the host 2 proceeds (at block 216) back to block 204 to consider the next (i+1)th existing channel path.

To determine the source and destination ports of the proposed channel path as well as the existing channel paths to the storage controller, the host 2 would access internal I/O configuration information that provides information on the switch ports used by the channel paths (CHPIDs). As discussed, the existing channel paths to the target storage controller 8, 10 can be determined from the SSCB for the storage controller 8, 10 in the channel subsystem 14.

Determining the Availability of Interface Ports in the Storage Controller

To determine the availability index for the storage controller, the host 2 will have to determine any storage controller components, i.e., single points of failure, the proposed channel path shares with any of the existing channel paths to the storage controller. As discussed, the proposed and existing channel paths may share an interface card 20a, b, c, d, 22a,b, c, d (FIG. 1), an I/O bay 29a, b, 31a, b or a cluster 32a, b and 34a, b.

In preferred embodiments, to determine the configuration of the storage controller 8 or 10, the host 2 will consider the node description data, also known as a node descriptor (ND), which is data currently provided by storage controller systems. Storage controller self-description data is available for each interface port 24a, b, c, d; 26a, b, c, d; 28a, b, c, d; 30a, b, c, d on the storage controllers 8 or 10. The host 2 would issue a Set Interface ID command with a Read Node Descriptor suborder chained into a Read Node Descriptor command to the storage controller 8 or 10 through a channel path that connects to one interface port 24a, b, c, d; 26a, b, c, d; 28a, b, c, d; 30a, b, c, d. Details of the node descriptor record (ND) is described in IBM document "Enterprise Systems Architecture/390: Common I/O-Device Commands", IBM document no. SA22-7204-02 (Copyright IBM, 1995) and U.S. Pat. No. 5,197,069, assigned to IBM, which publications and patent are incorporated herein by reference in their entirety.

Figure 7:
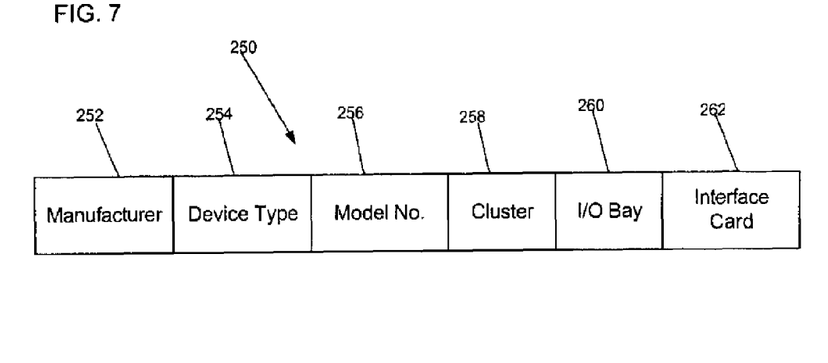
FIG. 7 illustrates fields of data included in a node descriptor that are used with the preferred embodiments of the present invention to determine the availability of a proposed interface to the control unit.

The node descriptor (ND) the storage controller 8 or 10 returns to the host provides specific information for the interface port through which the host 2 submitted the read command. The node descriptor (ND) includes fields providing the manufacturer, device type, and model number of the storage controller. The node descriptor further includes a two byte tag, at bytes 30 and 31, that provides information on the cluster, I/O bay, and interface port for the interface to the storage controller on which the read configuration data command was transmitted. FIG. 7 illustrates the fields included in the node descriptor utilized with the preferred embodiments of the present invention. Storage controllers from other manufacturers, such as Storage Technology Corporation (StoragTek) and the EMC Corporation, also provide this information in the node descriptor (ND), which the host 2 may obtain for any connection from a channel path through a physical path to the storage controller.

Figure 8:
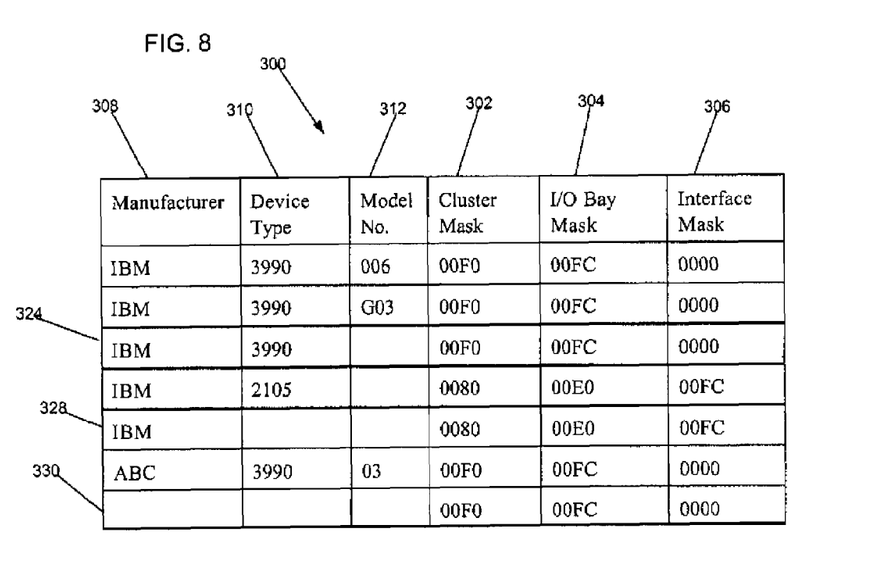
FIG. 8 illustrates a table of masks to apply to the node descriptor data in accordance with preferred embodiments of the present invention.

In preferred embodiments, the host 2 maintains in memory a control unit model table 300, shown in FIG. 8, that provides a cluster 302, I/O bay 304, and interface card 306 masks for different types of storage controllers, identified by manufacturer, device type, and model number. The masks are used to extract the bits from the node descriptor (ND) two byte tag for a particular type of storage controller to determine the cluster, I/O bay, and interface card of the node from which the node description data was read. If only one bit is provided in the mask, then only one bit is used to indicate the cluster, I/O bay and/or interface card, indicating that there are only two of the particular components. If two bits are provided in a mask, then there are four possible values for the cluster, I/O bay and/or interface card, etc. Further, the control unit model table 300 may provide information on all or numerous available storage controllers according to manufacturer 308, device type 310, and model number 312. If the table 300 does not indicate a particular model number, then the entry in the table is the default value for the manufacturer and device type, e.g., entry 324, would provide the masks 302, 304, and 306 for a storage controller of the particular manufacturer and of the device type when model number information is not otherwise found in the table. Likewise, if the device type and model number were not found in the table 300, the table provides masks 302, 304, 306 in entry 328 for a storage controller of the particular manufacturer, e.g., IBM, when there is no device type and model data. Similarly, the table 300 would include a default entry of masks 302, 304, 306 when no matching manufacturer data is provided, as in entry 330.

In this way, the host 2 can use the table 300 to extract information from the node descriptor, which is currently provided in storage controller devices, on the location of the particular interface port 24a, b, c, d; 26a, b, c, d; 28a, b, c, d; 30a, b, c, d through which the host 2 is accessing the storage controller 8 or 10. In preferred embodiments, the masks are ordered from most significant point of failure to least, from left to right, e.g., cluster to I/O bay to interface card. It is possible that the storage controller will not provide a bit mask for any particular component, i.e., the mask bits for the I/O bay 304 and interface card 306 may be zero. Further, if the storage controller did not include an I/O bay, then the table 300 would not include a mask field for an I/O bay. The two byte mask may be AND-ed against the tag in the node descriptor (ND) to extract information on the cluster, I/O bay and/or interface card of the interface port.

Figure 9A:
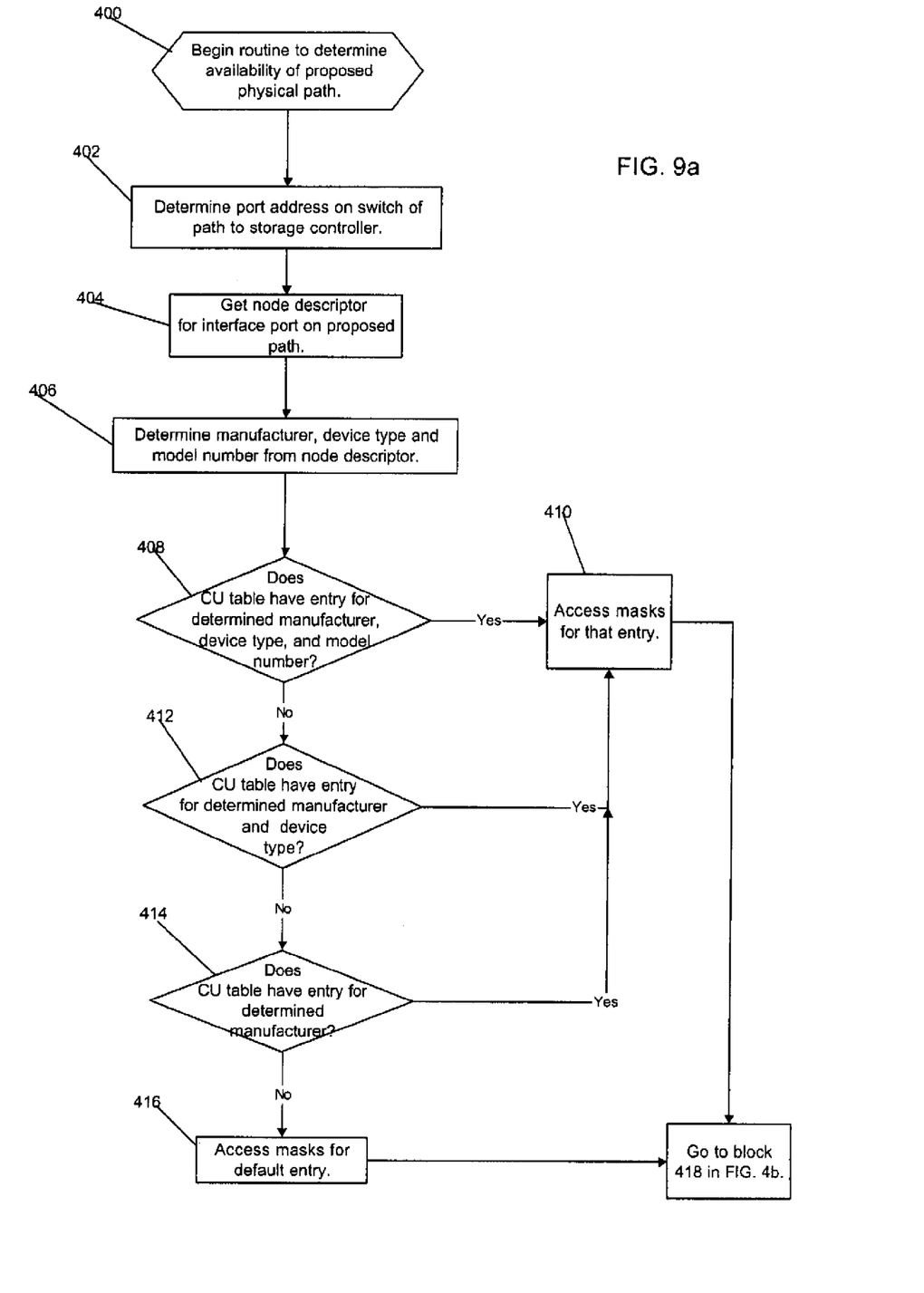
FIGS. 9a and 9b illustrate logic to determine an availability of a proposed interface to a control unit in accordance with preferred embodiments of the present invention.
Figure 9B:
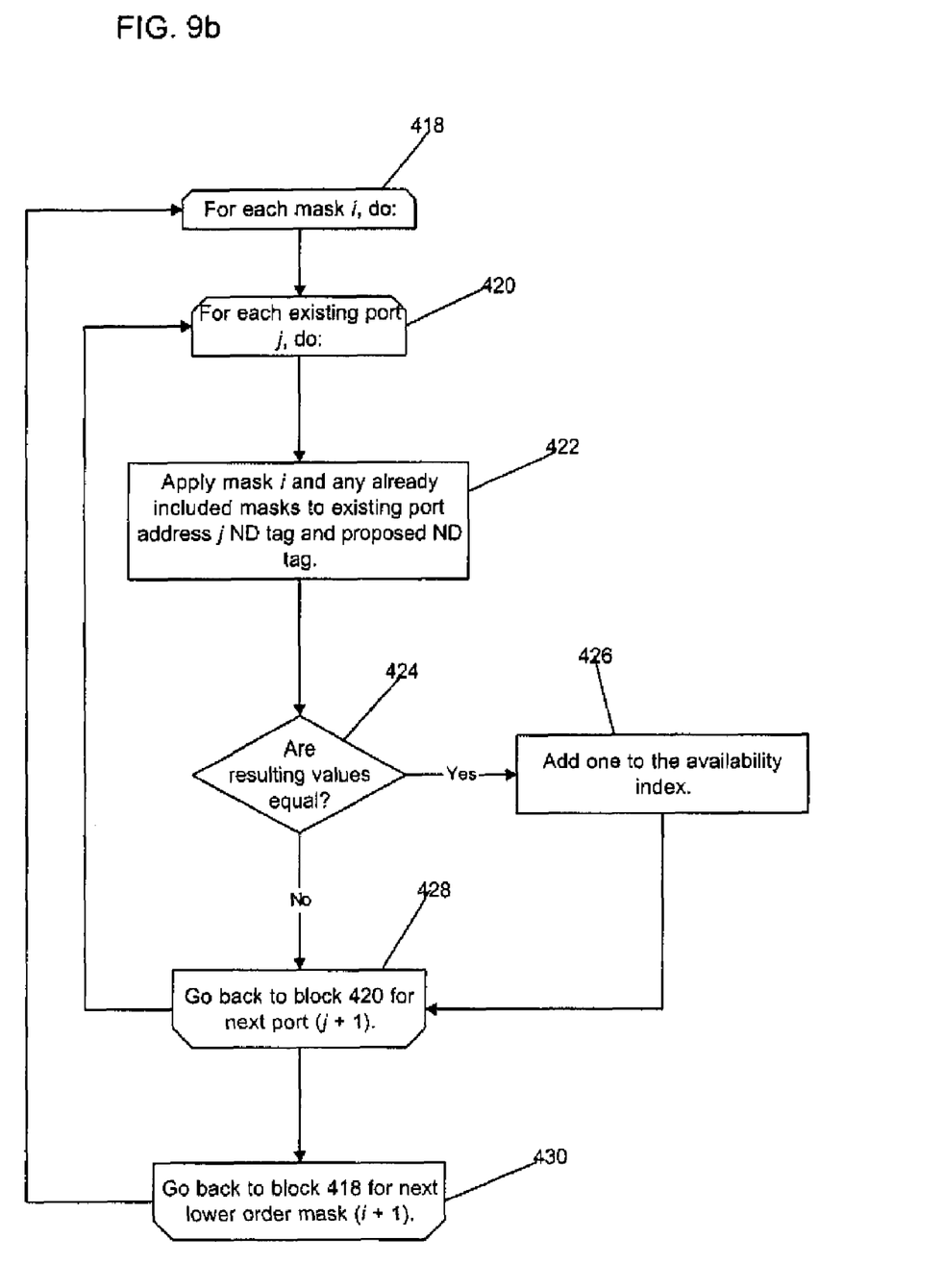

FIGS. 9a, b illustrate logic implemented in the host 2 to determine an availability index of a proposed interface port connection to the storage controller 8 or 10 when determining a physical path to use for a new channel 18a, b, c, d. The host 2 would execute the logic in FIGS. 9a, b for each interface port at the storage controller 8 or 10 that is used by a proposed channel path that is being considered to provide a new path to the storage controller. The logic of FIGS. 9a, b determines an availability index for the storage controller for each proposed channel path to the storage controller. The availability index of the storage controller indicates the extent that the interface port for the proposed channel path shares storage controller components with the existing channel paths that have interface ports on the target storage controller.

Control begins at block 400 with the host 2 initiating the routine to determine the storage controller availability from a proposed channel path to a proposed interface port. The host 2 determines (at block 402) the port address of one port on the switch 4 or 6 that has a connection line to the proposed interface port of the proposed channel path. Identification of the port address on the switch 4 or 6 thus specifies one proposed interface port because a connection line is provided from the switch 4 or 6 port address to the interface port. The host 2 then obtains (at block 404) the node descriptor (ND) for the proposed interface port by issuing a Set Interface ID command chained to a read node identifier to the proposed interface port. From fields in the obtained node descriptor data, the host 2 can determine (at block 406) the manufacturer, device type and model number of the storage controller 8 or 10.

If the control unit table 400 has an entry for the determined manufacturer, device type, and model number (at block 408), then the host 2 accesses (at block 410) the cluster 302, I/O bay 304, and interface card 306 masks for that entry. Otherwise, if the control unit table 300 does not have an entry for the determined manufacturer, device type, and model number, then the host 2 determines (at block 412) whether the control unit table 300 has an entry for the determined manufacturer and device type. If so, the host 2 accesses (at block 410) the masks 302, 304, and 306 for that entry. Otherwise, if the control unit table 300 does not have an entry for the determined manufacturer and device type, then the host 2 determines (at block 414) whether the control unit table 100 has an entry for the determined manufacturer. If so, then the host 2 accesses (at block 410) the masks 302, 304, and 306 for that entry. If there is no entry for the determined manufacturer, device type and model number, then the host 2 accesses (at block 416) the masks 302, 304, 306 for the default entry 330.

After accessing the cluster 302, I/O bay 304, and interface card 306 masks, the storage controller proceeds to block 418 in FIG. 4b to perform the availability index calculations. To calculate the availability index for the proposed interface port connected to the determined switch port address, the host 2 executes two loops. An outer loop from blocks 418 to 430 performs blocks 420-428 for each mask accessed from the entry, starting from the highest order mask to the lowest order mask (e.g., cluster mask to I/O bay mask to interface card mask, etc.). For each mask, an inner loop from blocks 420-428 performs blocks 420-426 for each existing interface port to which a channel 18a, b, c, d is assigned. At block 422, the host 2 applies mask i to the tag bytes in the node descriptor (ND) for the interface port connected to the switch 4 or 6 port address j, to which a path is already assigned, and the accessed tag bytes of the proposed interface port. The host 2 would maintain the NDs of existing interface ports, which were previously accessed when assigning a channel 18*a, b, c, d* to the physical path. If there are any higher order masks, then those are also applied. Thus, for mask 1, which is the highest order cluster mask, only that mask would be applied.

In this way, points of failure are determined at a failure level, which includes the values of previous, higher order levels of failure. As discussed, a higher order level of failure is a failure that would also cause the failure of a lower order level, whereas a failure at a lower order level will not completely cause the higher level component to fail as there are other paths to the higher level. If the two values obtained from applying the mask(s) are equal (at block 424), then a one is added (at block 426) to the availability index for the proposed interface port 24*a, b, c, d*; 26*a, b, c, d*; 28*a, b, c, d*; 30*a, b, c, d* to lower the actual availability. Thus, in this example implementation, a higher availability index indicates that a proposed interface port would have more points of failure in common with the currently used interface ports than proposed interface ports with a lower availability index rating. Otherwise, if the values are not equal, then nothing is added to the availability index, and the next proposed interface port 24*a, b, c, d*; 26*a, b, c, d* or 28*a, b, c, d*; 30*a, b, c, d* is considered. In this way, the availability index is increased for each currently used interface port that has the same point of failure at different levels, e.g., cluster, I/O bay, and interface card. The more single points of failure a proposed port 24*a, b, c, d*; 26*a, b, c, d* or 28*a, b, c, d*; 30*a, b, c, d* has in common with currently used interface ports, the less desirable the proposed interface port because such proposed interface port does not improve the availability of the overall system. The lower the availability index, the less likely the proposed interface port is to be affected by a failure in one of the levels, i.e., cluster, I/O bay, interface card, for an existing interface port.

Preferred embodiments provide a technique for determining the availability of a proposed interface port by using information, i.e., the tag bytes, and manufacturer, device type, and model number fields in the ND that are already available in storage controllers produced by many of the largest storage controller manufacturers, such as IBM, StorageTek, and EMC. This current information is exploited by providing a new control unit table that includes masks that can be used to extract the ND information for different interface ports to the storage controller including, the cluster, I/O bay, and interface card for the proposed interface port. In preferred embodiments, the host 2 may maintain such control unit tables 100 that may be updated from time to time. Alternatively, the masks to use for a storage controller may be provided directly from the storage controller 8, 10 in response to a request from the host 12, thereby avoiding the need to maintain the control unit table 100.

After the channel path, switch, and storage controller availability indexes are calculated at blocks 102, 104, and 106, the host 2 would then sum (at block 108) these three values together to obtain the availability index for all single points of failure in the proposed channel path, from the host adaptor, to the switch, to the target storage controller. After determining the availability index for every proposed path to the target storage controller 8, 10, the host 2 would select the proposed channel path having the lowest availability index, i.e., the channel path having the least number of shared components in the host 2, switch 4, 6 and storage controller 8, 10 with existing paths to the storage controller. This preferred process selects a channel path to add with the least number of single points of failure, i.e., the highest availability.

To remove a channel path from a storage controller 8, 10, the host 2 would consider each current channel path to the storage controller separately as a proposed path. The host 2 would determine the availability index or the number of components each existing channel path shares with the other existing channel paths. The host 2 would want to select for removal the existing channel path having the highest availability index, i.e., most points of failure, with respect to the other existing channel paths to the target storage controller. All the above logic could be used to separately determine the availability index for each existing channel path, except that each existing channel path would once comprise the proposed channel paths to be compared with all the other existing channel paths.

CONCLUSION

This concludes the description of the preferred embodiments of the invention. The following describes some alternative embodiments for accomplishing the present invention.

The preferred embodiments may be implemented as a method, apparatus or program using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, firmware, programmable logic, memory devices (e.g., EEPROMs, ROMs, PROMs, RAMs, SRAMs, etc.), hardware, electronic devices, a readable storage diskette, CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention.

The preferred embodiment technique can be applied whenever a determination is made of an availability index when connecting an adaptor to one of multiple available interface ports and can apply to connections between any two devices and is thereby not limited to selecting a channel path to connect a host to a storage controller. Further, the preferred embodiments could apply when determining a network connection, e.g., TCP/IP, etc., when selecting paths to use to connect with a remote device or computer over a network or Fibre Channel fabrics.

In the described embodiments, the availability indexes for the host, switch and storage controller were added together to determine an availability for the entire channel. In further embodiments, the availability indexes for the host, switch, and storage controller may be considered separately to determine a highest available host adaptor, switch port or interface port on the storage controller. For instance, the host 2 may then utilize this availability index for each proposed interface port when determining the interface port 24*a, b, c, d*; 26*a, b, c, d* or 28*a, b, c, d*; 30*a, b, c, d* to use in the new physical path for a new channel 18*a, b, c, d*.

Preferred embodiments were described with respect to three masks for considering three different failure and repair unit boundaries in the storage controller, including cluster, I/O bay, and interface card when determining availability. However, in alternative embodiments additional or fewer masks may be provided depending on the number of failure and repair unit boundaries being considered in the storage controller for the proposed path. In further embodiments, additional control unit and repair boundaries may be considered.

Preferred embodiments were described as implemented with large scale storage controllers, such as the IBM Enterprise Storage Server and 3990 storage controllers, and other similar class storage controllers that use similar node descriptor elements to provide information on a particular interface port at the storage controller. However, the preferred embodiments may apply to any control unit, storage controller, server or controller system that controls access to storage and that provides information on internal failure and repair boundaries that may be accessed and used to determine availability. Moreover, the preferred embodiments may apply to determine the availability to any type of addressable device, not just control units.

The host 2 may be any central electronic complex (CEC) system known in the art including multiple CPUs executing simultaneous operations. The CEC may include one or more operating systems. Thus, one CEC host can appear to operate as several host systems. Alternatively, the host 2 can be any server or computer known in the art.

Preferred embodiments were described with respect to a host system that communicates with a channel subsystem, which in turn communicates via channels to control units, which access the I/O devices. In alternative embodiments, the data paths may extend from the channel subsystem directly to the I/O device or, alternatively, from the host system directly to the I/O device without the intervention of the channel subsystem and subchannel constructs, control units and/or switches. In further embodiments there may be multiple switches in the path.

In summary, preferred embodiments disclose a system, method, and program for selecting one of multiple proposed paths to a device. For each proposed path, a determination is made of a number of components the proposed path shares with existing paths to the device. The components comprise points of failure such that if one component fails then the path including the component fails. The determined number of shared components for each proposed path is used to select one proposed path.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer system for selecting one of multiple proposed paths to a device, the computer system comprising:
a processor;
means, including the processor, for determining for each proposed path, a number of components the proposed path shares with existing paths to the device, wherein the components comprise points of failure such that if one component fails then the paths including the component fails; and
means, including the processor, for using the determined number of shared components for each proposed path to select one proposed path, wherein at least some of the components are included in other components that also comprise points of failure, wherein the components are lower level components, wherein the other components are higher level components, wherein a first higher level component includes a first plurality of lower level components, wherein a second higher level component includes a second plurality of lower level components, wherein both the first higher level component and the second higher level component can be used to connect to the device, and wherein the computer system further comprises:
(i) means, including the processor, for determining that an existing path to the device passes through one of the first plurality of lower level components; and
(ii) means, including the processor, for selecting, based on an indication provided by an availability index, a proposed path that passes through one of the second plurality of lower level components, in response to determining that the existing path to the device passes through one of the first plurality of lower level components.

2. The computer system of claim 1, wherein the computer system further comprises:
means for determining, via an automated program, the lower level components and the higher level components; and
means, including the processor, for selecting a proposed path through the components that avoids a single point of failure with existing paths.

3. The computer system of claim 1, wherein the components are first components, wherein the other components are second components, wherein a first selected path to the device passes through a first component included in a second component, and wherein a second selected path to the device passes through another of the first components not included in the second component.

4. The computer system of claim 1, wherein first components comprise port cards including ports, and wherein second components comprise switches.

5. The computer system of claim 1, wherein a first component and a second component are included in one hardware unit, wherein at least one proposed path couples the hardware unit to the device.

6. The computer system of claim 1, wherein the means for determining lower level components the proposed path has in common with existing paths further performs: determining whether the proposed path and each existing path use a same higher level component, wherein points of failure are determined at a failure level which includes values of previous higher order levels of failure.

7. The computer system of claim 1, wherein each path includes an adaptor in a computer and an interface port in the device, wherein determining the number of components the proposed path shares with existing paths further comprises determining a number of components the adaptor in the proposed path shares with the adaptors of existing paths to the device and determining a number of components the proposed path shares with the interface ports of existing paths to the device.

8. The computer system of claim 7, wherein each path further includes a source port and destination port on a switch, wherein the adaptor for a path connects to the source port of the switch and wherein the interface port for the path connects to the destination port of the switch, wherein determining the number of components the proposed path has in common with existing paths further comprises determining components on the switch the proposed path has in common with existing paths.

9. The computer system of claim 1, wherein one of the components is replaced in response to a failure of one of the other components.

10. The computer system of claim 1, wherein the availability index indicates a likelihood that a path maintains availability in an event of failure of one of the higher or one of the lower level components of the path.

11. A computer readable storage medium for use in selecting one of multiple proposed paths to a device, wherein code embedded in the computer readable storage medium is capable of causing a processor to perform:

for each proposed path, determining a number of components the proposed path shares with existing paths to the device, wherein the components comprise points of failure such that if one component fails then the paths including the component fails; and using the determined number of shared components for each proposed path to select one proposed path, wherein at least some of the components are included in other components that also comprise points of failure, wherein the components are lower level components, wherein the other components are higher level components, wherein a first higher level component includes a first plurality of lower level components, wherein a second higher level component includes a second plurality of lower level components, wherein both the first higher level component and the second higher level component can be used to connect to the device, and wherein the code is further capable of causing the processor to perform:

(i) determining that an existing path to the device passes through one of the first plurality of lower level components; and (ii) selecting, based on an indication provided by an availability index, a proposed path that passes through one of the second plurality of lower level components, in response to determining that the existing path to the device passes through one of the first plurality of lower level components.

12. The computer readable storage medium of claim 11, wherein the code is further capable of causing the processor to perform:

determining, via an automated program, the lower level components and the higher level components; and selecting a proposed path through the components that avoids a single point of failure with existing paths.

13. The computer readable storage medium of claim 11, wherein the components are first components, wherein the other components are second components, wherein a first selected path to the device passes through a first component included in a second component, and wherein a second selected path to the device passes through another of the first components not included in the second component.

14. The computer readable storage medium of claim 11, wherein first components comprise port cards including ports, and wherein second components comprise switches.

15. The computer readable storage medium of claim 11, wherein a first component and a second component are included in one hardware unit, wherein at least one proposed path couples the hardware unit to the device.

16. The computer readable storage medium of claim 11, wherein determining lower level components the proposed path has in common with existing paths further comprises: determining whether the proposed path and each existing path use a same higher level component, wherein points of failure are determined at a failure level which includes values of previous higher order levels of failure.

17. The computer readable storage medium of claim 11, wherein each path includes an adaptor in a computer and an interface port in the device, wherein determining the number of components the proposed path shares with existing paths further comprises determining a number of components the adaptor in the proposed path shares with the adaptors of existing paths to the device and determining a number of components the proposed path shares with the interface ports of existing paths to the device.

18. The computer readable storage medium of claim 17, wherein each path further includes a source port and destination port on a switch, wherein the adaptor for a path connects to the source port of the switch and wherein the interface port for the path connects to the destination port of the switch, wherein determining the number of components the proposed path has in common with existing paths further comprises determining components on the switch the proposed path has in common with existing paths.

19. The computer readable storage medium of claim 11, wherein one of the components is replaced in response to a failure of one of the other components.

20. The computer readable storage medium of claim 11, wherein the availability index indicates a likelihood that a path maintains availability in an event of failure of one of the higher or one of the lower level components of the path.

* * * * *